United States Patent

[11] 3,610,407

| [72] | Inventor | Donald T. Prodzenski<br>Glen Ellyn, Ill. |
| --- | --- | --- |
| [21] | Appl. No. | 864,142 |
| [22] | Filed | Oct. 6, 1969 |
| [45] | Patented | Oct. 5, 1971 |
| [73] | Assignee | Alpeda Industries, Inc.<br>Golf, Ill.<br>Continuation-in-part of application Ser. No.<br>792,595, Jan. 21, 1969. |

[54] QUICK-CHANGE COUPLING DEVICE FOR CONVEYOR-TRANSPORTED MEMBERS
18 Claims, 5 Drawing Figs.

[52] U.S. Cl. .................................................. 198/131,
198/175, 198/204
[51] Int. Cl. ..................................................... B65g 19/02
[50] Field of Search ............................................... 198/131,
189, 194, 204, 175, 151; 74/258

[56] References Cited
UNITED STATES PATENTS

| 1,764,461 | 6/1930 | Meem | 198/151 X |
| 1,917,134 | 7/1933 | Levin | 198/204 X |
| 2,222,025 | 11/1940 | Fischer | 198/189 |
| 3,338,375 | 8/1967 | Evans | 198/131 X |

*Primary Examiner*—Joseph Wegbreit
*Assistant Examiner*—Bruce H. Stone, Jr.
*Attorney*—Hill, Sherman, Meroni, Gross & Simpson ABSTRACT: A quick-change coupling device for members transported by a conveyor oriented to travel a given path comprises respective structure carried by the member and the conveyor, and coactive means on the structures enabling relative assembly and separation of the structures transversely relative to the path of the conveyor. In a specific embodiment, the structures of the device are a tee and a complementary yoke.

PATENTED OCT 5 1971
3,610,407
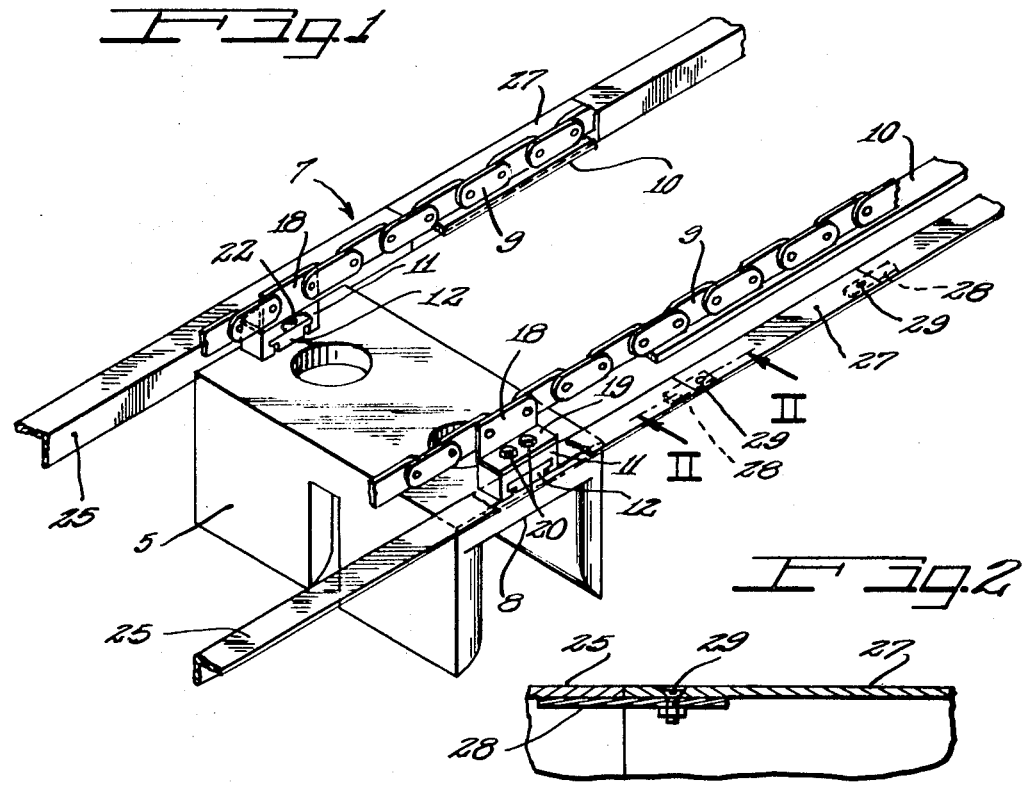
Fig.1
Fig.2
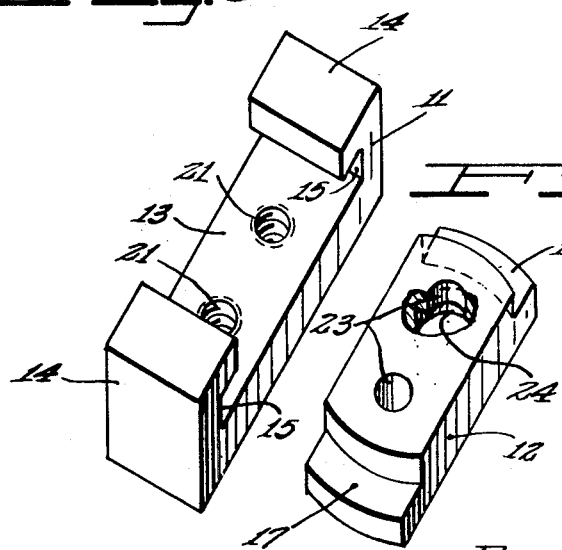
Fig.3
Fig.4
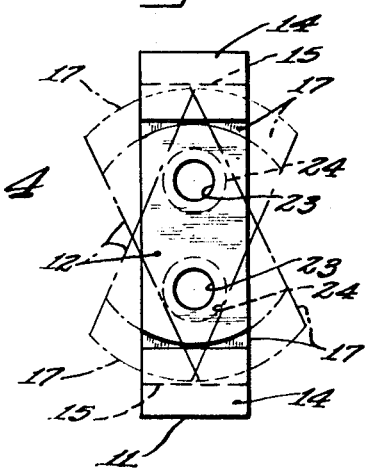
Fig.5
INVENTOR.
Donald T. Prodzenski
BY *Hill, Sherman, Meroni, Gross & Simpson* ATTORNEYS

QUICK-CHANGE COUPLING DEVICE FOR CONVEYOR-TRANSPORTED MEMBERS

This application is a continuation-in-part of my application Ser. No. 792,595 filed Jan. 21, 1969.

This invention relates to a new and improved quick-change coupling device for conveyor-transported members, and is more particularly concerned with such a device especially adapted for arrangements wherein specialized article carrying or maneuvering members must be replaced or changed in a conveyor system.

In apparatus such, for example, as that more fully described in the above-identified application, in which members carried by a conveyor system may from time to time be replaced or changed, a considerable problem resides in that much time and labor have generally been required in assembling and separation of the members with respect to the conveyor. In particular, where the conveyor-transported members must travel inverted, it is necessary that a connection between the members and the conveyor be quite positive, not only to assure movement of the members with the conveyor, but also to assure against dropping of the members from the conveyor while running inverted. Customarily the fastening devices employed have required the use of tools to manipulate the fastener parts, and sometimes necessitating dismantling of associated portions of the apparatus to gain access to the fasteners.

According to the present invention, the foregoing and other disadvantages, shortcomings, inefficiencies and problems are overcome by providing a new and improved quick-change coupling device in which coupling structures on the conveyor and on the conveyor-transported members have cooperative means enabling tool-free relative assembly and separation of the coupling structures transversely relative to the path of the conveyor.

An important object of the present invention is to simplify and expedite replacement of conveyor-transported members which must be operatively connected to run with the conveyor.

Another object of the invention is to provide new and improved means enabling tool-free relative assembly and separation of members which must be attached transportably in the operation of a conveyor.

A further object of the invention is to provide new and improved means which will enable article-engaging members on a conveyor to be quickly and efficiently assembled with or separated from a conveyor.

Still another object of the invention is to provide novel slidably interengageable means for coupling operating members with a conveyor.

Yet another object of the invention is to provide new and improved means especially adapted for quick-change coupling of operating members with a chain conveyor.

A yet further object of the invention is to provide new and improved quick-change coupling means for conveyor transported article-handling members enabling free self-adjustment and alignment of the couplings and significantly relieving the connected structures of stresses and strains.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary isometric view of a conveyor system embodying features of the invention;

FIG. 2 is an enlarged fragmentary sectional detail view taken substantially along the line II—II of FIG. 1;

FIG. 3 is an enlarged isometric view of one of the members of the coupling structure;

FIG. 4 is an isometric view of a complementary member of the coupling structure; and FIG. 5 is a plan view of the separable coupling members in their assembled relation.

By way of example, the invention has been disclosed in FIG. 1 as applied to effect quick change of a member 5 in respect to a transporting conveyor 7 in apparatus of the kind more fully disclosed in the aforementioned application, namely, a container rinser. In such environment, the member 5 is of generally U-shape cross section with its base attached to the conveyor and provides a pocket 8 which opens sidewardly to receive one or more, and in this instance two, containers such as bottles or jars to be rinsed. Although for illustrative purposes herein only one of the members 5 has been shown, a plurality of the pocket members 5 located at equally spaced intervals along the conveyor 7 are provided and the conveyor is caused to travel a continuous path in which the containers are received in upright condition in the pocket members, are inverted in a portion of the path and are then returned to an upright position, all while the conveyor 7 is operating at a fairly high speed. For this purpose, the conveyor comprises a pair of spaced parallel corunning link chains 9 to which the members 5 are attached. It will be understood, of course, that suitable guide means are provided in support of the conveyor chains 9, such means being represented more or less schematically as comprising rails 10.

According to the present invention, quick-change coupling means are provided to enable tool-free relative assembly and separation of the member 5 and the conveyor 7 transversely relative to the path of the conveyor. In a simple and efficient construction, this comprises a coupling including a yoke structure 11 and a separably receivable connector structure 12. The yoke 11 is of generally flattened C-shape provided with a generally T-shaped slot and having a base 13 elongated in one direction with respective coextensive arms 14 projecting from the opposite ends of the base and provided with respective undercut grooves 15 which open toward one another at the plane of the base 13 and run out or open from at least one edge of the yoke and preferably from both edges. Thereby the yoke 11 is adapted to receive respective opposite end portions 17 on the connector 12 which is shaped as a generally complementary block to be received with a lateral slidable relative assembly maneuver within the space between the arms 14. Desirably the end portions 17 comprise reduced thickness oppositely extending flanges complementary to the undercut grooves 15, with the intermediate portion of the connector 12 received between the outer end portions of the arms 14 such that the broad face of the intermediate portion lies desirably in a plane which is at least in and preferably slightly outwardly of a plane across the outer ends of the arms 14 in the assembly. By preference, the opposite ends of the generally T-shaped connector 12 both on the flanges 17 and on the intermediate portion are convexly arcuate not only to afford ease of lateral assembly of the coupling parts, but also to enable relative adjustment swiveling, indicated in somewhat exaggerated form for illustration in FIG. 5 on comparison of the respective opposite dot-dash positions and the full line squared-up aligned position shown.

One of the coupling structures 11 and 12 is carried by the conveyor 7 while the other is carried by the member 5. To this end the yoke 11 is desirably secured to one of the conveyor chains 9 by means comprising a bracket link 18 of angular cross section having a yoke-mounting flange 19 to which the yoke 11 is secured as by means of screws 20, the threaded shanks of which are adapted to be received in suitable spaced tapped holes 21 in the base 13. Mounting of the yoke 11 is thereby effected with the undercut grooves 15 opening laterally of the supporting conveyor chains 9 and transversely to the path of movement of the conveyor. To enable transverse assembly or separation of the member 5 relative to the path of movement of the conveyor 7, the T-connector 12 is secured in proper position on the back surface of the member 5 with the broad face of the intermediate portion of the connector confronting such backface. Screws 22 (FIG. 1) may be employed to secure the connector 12 onto the member 5, suitable screw shank bores 23 being provided through the intermediate portion of the connector and having respective counterbores 24 to receive the screw heads within the plane of the head or longest broad surface of the connector 12 to avoid interference with free sliding engagement of such surface with the confronting surface of the base 13 of the coupling yoke. In the arrangement shown, each of the conveyor chains 9 carries one of the coupling yokes 11 in transverse alignment, and each end portion of the member 5 carries one of the coupling connectors 12 for balanced support of the member on the conveyor.

Assembly or separation of the member 5 relative to the conveyor chains 9 is easily effected by relative movement transverse to the path of movement of the conveyor quite conveniently and with the range of transverse relative movement governed only by the width of the couplings which are therefore desirably as narrow as practical having regard to the operating forces and load-bearing characteristics of the coupling structures. In the construction disclosed, the member 5 may be lifted generally into position relative to the conveyor with the coupling connectors 12 aligned with the yokes 11 and then moved transversely the small distance of the width of the coupling structure to effect full coupled assembly. Separation is effected by reversing the procedure. By having the coupling grooves 15 opening at both sides of the yoke, the assembly and separation procedure may be effected from either side of the conveyor. By virtue of the arcuate ends on the connectors 12, moderate deviations from true normal or right angular alignment of the coupling yokes 11 relative to the path or axis of movement of the conveyor by reason of tolerances in the conveyor chains 9 are easily accommodated. Further, in operation of the conveyor looseness or longitudinal relative tension or tolerance movements or slight maladjustments in the respective chains 9 are easily accommodated by the couplings by virtue of their swiveling ability.

In order to retain the couplings assembled, retaining and guide means desirably in the form of respective opposite side bars 25 are provided which confront the respective outer sides of the couplings and prevent unintentional transverse uncoupling displacement of the connectors 12 relative to the yokes 11. To enable assembly and separation for quick change of the members 5 relative to the conveyor, a suitable gate 27 is provided in at least one of the retaining or guard bars 25 and if desired in both of such bars. In one desirable form, the gate 27 comprises a removable section of the associated bar with suitable latch means for connecting the gate fixedly in place during operation of the conveyor. The latch means may be of any preferred construction and in a simple form is shown as respective latch bars 28 (FIGS. 1 and 2) fixedly attached to one of the gate or the associated bar, in this instance the bar at each end of the gate and projecting into engagement with the gate to which the respective latch bar is adapted to be detachably secured as by means of a bolt 29. Through this arrangement, ready access and clearance are provided for assembly or separation of the members 5 individually through one of the open gates 27 by inching the conveyor to register the successive coupling areas thereof with the gate. Thus, any one of the members 5 may be quickly changed with only a relatively momentary stoppage of the conveyor, and an entire set of the members 5 may be quickly replaced with only minimal shutdown of the associated apparatus. This affords maximum use for the apparatus in any given working period, even though one or more changes may be required, as for example where different sizes or types of containers or other articles are to be processed, depending upon the type of article for which the apparatus is designed.

It will be understood, of course, that although in the construction exemplified in FIG. 1, the yokes 11 are depicted as carried by the conveyor chains and the T-connectors 12 are shown as carried by the member 5, the relative arrangement may be reversed wherein the yokes 11 are carried by the member 5 and the T-connectors 12 carried by the chains. In such event the threaded screw holes 21 of the yoke and the counterbored screw bores 23 of the connector may be interchanged. The quick-change capability of the coupling structure remains the same. A practical reason for having the particular arrangement shown wherein the yokes 11 are carried by the chains and the connectors 12 by the member 5 is that the connectors 12 are the smaller and thus less expensive item of the coupling and also the smaller part so that it is advantageous from both a weight and handling consideration, but more importantly a cost consideration where there may be several sets of the members 5 for different size articles to be interchangeably used with the same conveyor.

I claim as my invention:

1. A quick-change coupling device for a member transported by a conveyor operated to travel a given path:
   a coupling structure adapted to be carried by the member;
   a coupling structure adapted to be carried by the conveyor; and
   coactive means on said structures enabling tool-free relative assembly and separation of said structures transversely with respect to the path of the conveyor;
   one of said coupling structures provided with a generally T-shaped slot, and the other of said coupling structures being of complementary T-shape and received in said slot;
   said other of said coupling structures having arcuate surfaces thereon enabling relative swiveling of the structures.

2. An apparatus for transporting articles such as containers along a path:
   a conveyor comprising link chain means;
   article-handling members;
   complementary respective coupling means on said chain means and on said members enabling tool-free relative assembly and separation of said members relative to said chain means transversely relative to said path;
   said coupling means comprising respective yokes having transverse T-shaped slots and respective complementary T-shaped connectors receptive in said slots; and
   retaining and guard bars alongside said coupling means to prevent unintentional transverse displacement of said members relative to said chain means.

3. Apparatus according to claim 2, including a gate in at least one of said bars adapted to be opened to enable assembly and separation of said members relative to said chain means.

4. Apparatus according to claim 2, said connectors having arcuate surfaces thereon enabling relative swiveling with respect to said yokes.

5. In combination with a conveyor oriented to travel a path, and a transported member in assembly therewith, the improvement comprising a quick-change coupling device, including:
   coupling structure carried by said conveyor;
   coupling structure carried by said member; and
   coactive means on said structures enabling tool-free relative assembly and separation of said member and said conveyor transversely relative to said path;
   said coupling structure carried by the conveyor comprising a flattened C-shaped yoke, and said structure carried by said member comprising a T-shaped connector complementary to and receivable in said yoke;
   said structures having surfaces thereof related for relative swiveling movement of the yoke and connector.

6. Apparatus according to claim 5, including retaining and guard bars alongside the conveyor and said coupling device to prevent unintentional transverse displacement of said member relative to said conveyor.

7. Apparatus according to claim 6, including a gate in at least one of said bars adapted to be opened to enable assembly and separation of said member relative to said conveyor.

8. A quick-change coupling device for a member transported by a conveyor operated to travel a given path, comprising:
   a coupling structure part adapted to be carried by the member;
   a coupling structure part adapted to be carried by the conveyor; and coactive means on said parts enabling tool-free relative sliding assembly and separation of said parts transversely with respect to the path of the conveyor;

said parts having respective surfaces in slidable confronting relation in assembly;

one of said parts having tapped screw holes adapted to receive threaded shanks of attachment screws to connect it to the conveyor;

the other of said parts having screw bores through which shanks of screws are freely received for attaching said member thereto and with counterbores in the ends of the screw bores at the respective surface of said other part to accommodate screwheads within the plane of such surface whereby to enable said sliding assembly of the parts.

9. A device according to claim 8, in combination with spaced-apart conveyor link chains across and between which the members extend, there being an assembly of said parts on each of said chains for each of said members, and said sliding assembly of said parts enabling ready mounting and removal of the members by the sliding assembly relationship of said parts in direction transversely relative to said chains.

10. A device according to claim 9, one of said parts having arcuate surfaces thereon enabling relative swiveling of the parts.

11. The combination of claim 9, including retaining and guard bars alongside said chains and cooperating to prevent unintentional transverse displacement of said members relative to said chains.

12. The combination of claim 11, including a gate in at least one of said bars adapted to be opened to enable assembly and separation of said members relative to said chains.

13. In apparatus for transporting articles such as containers along a path:

a conveyor comprising spaced-apart link chains;

an article-handling member extending across and between said chains;

complementary respective coupling means on said chains and on said member in freely slidable relative assembled relation enabling ready slidable assembling and separation of the member transversely relative to said chains and remaining thus in the assembly in order to permit quick-change removal and replacement of the member; and means cooperatively related along the outsides of the chains to retain the member against unintentional transverse displacement relative to the chains.

14. Apparatus according to claim 13, said coupling means comprising respective parts on said chains having T-shaped slots therein extending transversely relative to the chains, and respective generally T-shaped coupling members engageable in said slots and mounted on said member on respective opposite portions thereof extending across said chains.

15. Apparatus according to claim 13, said coupling means comprising parts on the chains and on said member enabling relative swiveling of the parts to accommodate relative tolerance movements or slight maladjustments in the respective chains.

16. Apparatus according to claim 13, including longitudinal running supporting means for said chains intervening between said member and said chains, and structure clearing said supporting means and connecting said coupling means on the chains thereto.

17. Apparatus according to claim 13, said retaining means comprising longitudinally extending bars.

18. Apparatus according to claim 17, including a gate in at least one of said bars adapted to be opened to enable assembly and separation of said member relative to said chains.